United States Patent [19]

Watkins et al.

[11] 4,455,285

[45] Jun. 19, 1984

[54] HEAT TREATMENT OF MATERIAL

[76] Inventors: David W. Watkins, The Elms, Villa Rd., Plumtree, Nottinghamshire; Peter C. Wheatley, 63 Windsor Rd., Evesham, Worcestershire; William G. Kaye, 3 Jersey Ave., Cheltenham, Gloucestershire, all of England

[21] Appl. No.: 251,119

[22] Filed: Apr. 6, 1981

Related U.S. Application Data

[63] Continuation of Ser. No. 61,246, Jul. 27, 1979, abandoned.

[30] Foreign Application Priority Data

Aug. 8, 1978 [GB] United Kingdom ............... 32539/78

[51] Int. Cl.[3] ............................................. C04B 11/02

[52] U.S. Cl. .................................... 423/171; 422/146; 432/15; 432/58; 432/148; 432/188

[58] Field of Search ..................... 432/14, 15, 58, 148, 432/188; 423/171, 172; 422/146

[56] References Cited

U.S. PATENT DOCUMENTS

| | | | |
|---|---|---|---|
| 3,299,947 | 1/1967 | Boucraut et al. . | |
| 4,002,201 | 1/1977 | Donaldson | 165/166 |
| 4,176,157 | 11/1979 | George et al. | 423/555 |

FOREIGN PATENT DOCUMENTS

| | | |
|---|---|---|
| 871000 | 6/1961 | United Kingdom . |
| 1018464 | 1/1966 | United Kingdom . |
| 1223995 | 3/1971 | United Kingdom . |
| 1240655 | 7/1971 | United Kingdom . |
| 1388552 | 3/1975 | United Kingdom . |
| 1488665 | 10/1977 | United Kingdom . |
| 1493096 | 11/1977 | United Kingdom . |

OTHER PUBLICATIONS

Perry, *Chemical Engineers' Handbook,* McGraw-Hill Book Co., Inc., (1950), pp. 473, 474.

Welty et al., *Fundamentals of Momentum, Heat and Mass Transfer,* (1969), John Wiley & Sons, Inc., pp. 251-259.

*Primary Examiner*—O. R. Vertiz
*Assistant Examiner*—Wayne A. Langel
*Attorney, Agent, or Firm*—Stevens, Davis, Miller & Mosher

[57] ABSTRACT

A method for heat treating a material such as gypsum mineral, consists in burning a fuel in a combustion bed which is in heat exchange contact through bounding walls with beds of the material to be heated. Combustion gases are passed from the combustor through the heat treatment vessels containing beds and these gases then serve to fluidize at least partly and add heat to the beds through the agency of distributors.

19 Claims, 2 Drawing Figures

HEAT TREATMENT OF MATERIAL

This is a continuation of application Ser. No. 61,246 filed July 27, 1979, now abandoned.

This invention relates to the heat treatment of material in discrete form.

In particular, although not exclusively, the invention has reference to calcining and dehydration of crushed mineral matter, for example gypsum. In a conventional plant employed for such heat treatment, fuel, which may be solid, liquid or gaseous, is burnt in a combustion chamber and the hot combustion gases are applied to special containers in which the material is held. In order to maximise heat transfer, the gases are sometimes ducted through the material and around the side walls of the containers, the material being stirred. One disadvantage of these arrangements is that the combustion equipment utilises a number of parts each requiring maintenance and replacement from time to time. Moreover, stirring of the material renders the plant less efficient than it would otherwise be.

Fluidised bed combustion has in recent years reached a stage of successful commercial exploitation because of its versatility in affording a high combustion intensity and efficiency, a continuous operation capability, automatic control of the combustion process and an ability to burn a wide range of fuels. It has already been appreciated that a fluidised bed combustor can be used for heating fluids, e.g. water or gases and that the combustion gases can be employed in waste heat recovery units.

It is an object of the present invention to provide a method and apparatus for the heat treatment of material in discrete form, using the fluidised bed combustion principle.

Accordingly a first aspect of the present invention provides a method for the heat treatment of material in discrete form, the method including the steps of burning a fuel in a fluidised combustion bed, arranging a heat treatment bed of the material in close adjacency with the combustion bed such as to be in heat exchange relation therewith, and introducing combustion gases from the combustion bed into the heat treatment bed which is fluidised at least partly by said gases.

The fuel is conveniently burnt in the fluidised combustion bed at temperatures of about 800° C. or above.

Advantageously the combustion gases from the fluidised combustion bed are passed in heat exchange relation with the heat treatment bed prior to the introduction of the gases into the heat treatment bed. The gases, when introduced into the heat treatment bed, give up heat to the material as well as assisting in or effecting the fluidisation of the bed.

Preferably in the use of the method according to the first aspect of the invention, the level of material in the heat treatment bed is maintained above the top level of the fluid combustion bed.

Conveniently the combustion gases before their introduction into the heat treatment bed may be passed in heat exchange relation with the material to be treated before the material is fed into the heat treatment bed to preheat the material.

Alternatively the combustion gases may be used to preheat the fluidising and combustion air prior to the introduction of the air into the combustion bed.

The heat treatment bed may be fluidised wholly by the combustion gases from the combustion bed.

The material to be heat treated may be a calcium sulphate material e.g. gypsum. In such a case upon heat treatment a reaction occurs driving off water in the form of steam which has a fluidising effect in the material bed. In this instance, therefore, the heat treatment bed is fluidised by the vaporous reaction product and the combustion gases from the combustion bed.

According to a second aspect of the invention apparatus for the heat treatment of a material in discrete form includes a combustor adapted to contain a fluidised combustion bed of particulate material, a fuel inlet for the combustor, an exhaust gas outlet for the combustor, a heat treatment vessel disposed in close adjacency with the combustor and adapted to contain a bed of material in discrete form, a material inlet and a material outlet in the vessel, and inlet means for introducing into the vessel combustion gases from the combustor.

Preferably the inlet means are fluidising means for receiving and distributing the combustion gases into the vessel. The fluidising may be in the form of sparge pipes arrayed across the base of the or each heat treatment vessel.

Alternatively the fluidising means may comprise a gas-permeable support plate surmounting a plenum chamber for receiving the combustion gases.

Conveniently in one embodiment more than one heat treatment vessel is provided, the vessels being of cuboidal form located either side of the combustor on the side walls thereof. The combustor may alternatively be of circular section and the heat treatment vessel may then be of annular form surrounding the combustor. As a further alternative, the combustor is of annular section and surrounds a heat transfer vessel of circular section.

Conveniently heat exchange means are provided and arranged in heat exchange relation with the or each vessel and are adapted to receive the combustion gases from the combustor.

The heat exchange means may pass through the or each vessel or circumjacent thereto.

The heat exchange means may advantageously comprise ducting extending from the exhaust gas outlet into the vessel and through and in heat exchange contact with a bed of the material to be heated.

Conveniently and in order to optimise heat transfer, the combustor and the or each vessel have common bounding walls which have an extended area afforded by the use of protuberances and/or reentrants: for example, this may be achieved by an 'egg-box' type of design or by corrugations which can be of traditional sinusoidal or V-shaped or other suitable profile.

A heat exchanger may be provided for effecting heat transfer between the combustion gases and the material to be heat treated prior to its introduction into the or each vessel in order to preheat the material, the combustion gases thereafter passing into the or each vessel. Alternatively, or in addition, a heat exchange may be provided for preheating the fluidising air for the combustor by means of the combustion gases.

By way of example only, one form of a method and apparatus for the heat treatment of a material in discrete form according to the invention is described below with reference to the accompanying drawing in which.

Figure 1:
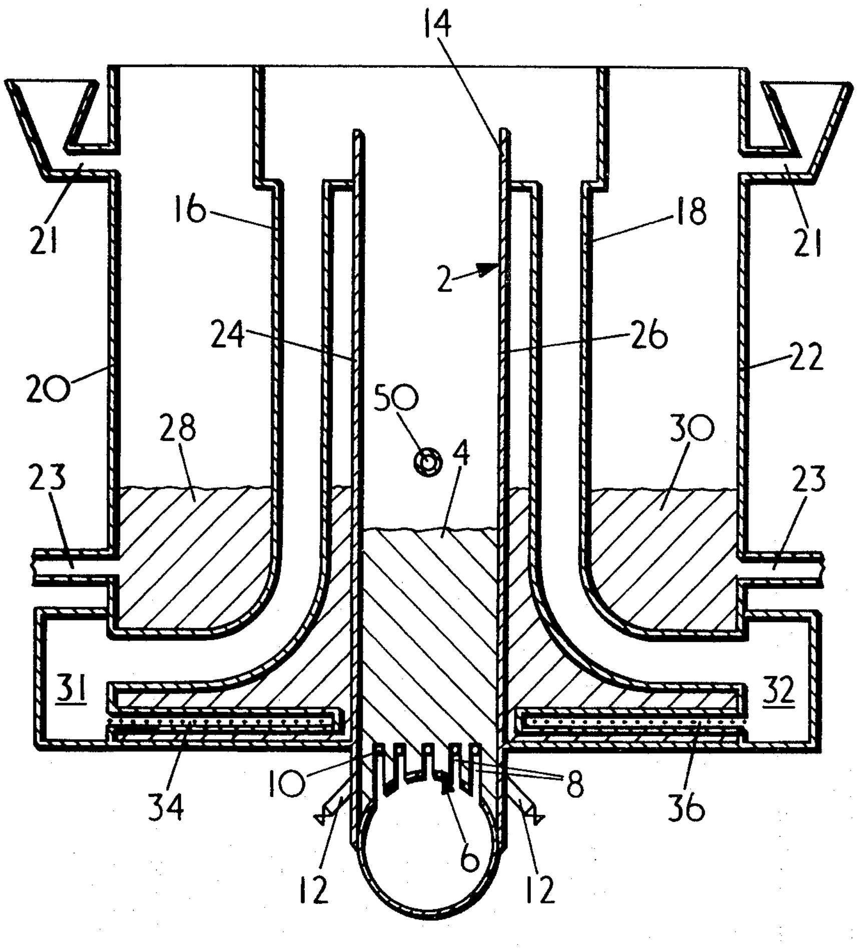
FIG. 1 is a diagrammatic sectional elevation.
Figure 2:
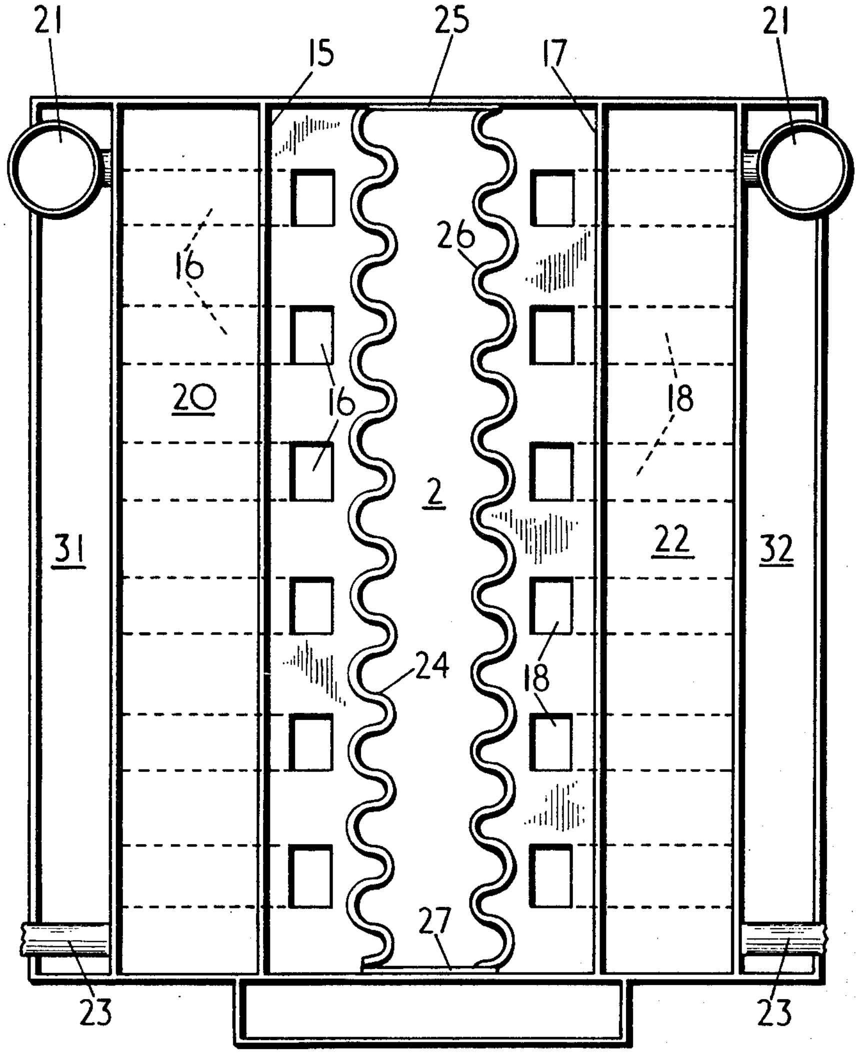
FIG. 2 is a sectional plan view of the apparatus of FIG. 1.

Referring to the drawing, apparatus for the heat treatment of material in discrete form includes a combustor 2 adapted to contain a fluidised bed 4 supported on a distributor 6 for fluidising gas, e.g. air. The distributor 6 is provided with a plurality of standpipes 8 each having outlets 10 extending radially at the top thereof. Valved outlets 12 are provided for removing material e.g. ash from the bed 4, and fuel inlet (only one 50 of which is shown) are located at each end of the combustor 2. A gas outlet 14 is provided in the combustor 2 and this communicates with manifolds 15, 17 which connect with heat exchange ducting 16, 18 extending into heat treatment vessels 20, 22 respectively. The vessels 20, 22 have common walls 24, 26 of stainless steel with the combustor 2 and end walls 25, 27, the walls 24, 26 being corrugated (see FIG. 2) up to a level above the top of material beds 28, 30 contained in the vessels 20, 22 respectively which have inlet means 21 for the material, for example gypsum, and outlet means 23 for the heat treated material, for example plaster. Conveniently the inlet and outlet means 21, 23 are located at opposite ends of the vessels 20, 22.

The heat exchange ducting 16, 18 of each vessel 20, 22 communicates with a distribution manifold 31, 32 to which are attached a number of hollow sparge pipes 34, 36 (only one of which in each vessel is shown) perforated with a plurality of holes, the pipes 34, 36 being disposed at the base of the vessels 20, 22, the holes being directed downwardly towards the base of the vessels.

In operation, the combustor 2 is started by passing hot gas to the distributor 6 and thence through the bed 4 to fluidise the bed and to raise its temperature to about 150° C. after which gypsum is fed into the vessels 20, 22 to a height corresponding approximately to that of the bed 4 to form beds 28, 30. The bed 4 is continuously heated by this gas until the temperature reaches a level at which combustion is self-sustaining, the coal being introduced via inlet 50. The flow of hot gas is thereafter discontinued and replaced with cold air.

The hot gases of combustion issuing from the bed pass through the outlet 14 and the manifolds 15, 17 into the ducting 16, 18 which extends through the beds 28, 30 in the vessels 20, 22 thereby releasing heat to the gypsum. After their passage through the beds 28, 30 the gases enter the manifolds 31, 32 whence they proceed to issue through the sparge pipes 34, 36 into the beds 28, 30 to fluidise the beds which, during continuous operation, are at a level above the height of bed 4. The heat treated material is removed from the vessels 20, 22 at a predetermined rate to ensure adequate residence time therein at the usual temperature of about 150° C., suitable control means (not shown) being provided for regulating the temperature and the material input/output rates.

Compared with other types of heat treatment methods and apparatus, it is envisaged that the efficiency attainable by using the present invention will be of the order of 90% with an enhanced input of material to be heated. It is further envisaged that the present invention will be compact compared with other heat treatment plants of similar output.

Whilst the present invention removes the need for stirring some types of discrete material to be treated, it may still be desirable to stir other materials.

It will be observed that for the method of the present invention no gas cleaning has been described and in fact combustion gases are fed directly into the material being heat treated even though they may have some contaminants which do not have any deleterious affect upon the material.

It will be understood that while the operation of the invention has been described in relation to the heat treatment of gypsum, other materials may be heat treated by using the method and apparatus of this invention.

We claim:

1. Apparatus for the heat treatment of a material in discrete form including a horizontally elongate combustor adapted to contain a fluidised combustion bed of particulate material and having at least one horizontally elongate imperforate thermally conductive wall for indirect heat exchange therethrough, a fuel inlet for the combustor, an exhaust gas outlet for the combustor, a heat treatment vessel disposed alongside the combustor and enclosing at least the said wall to receive heat transmitted therethrough from the combustion, the vessel being adapted to contain a bed of material in discrete form, a material inlet and a material outlet in the vessel, a plurality of heat exchange means passing through the vessel and communicating with the exhaust gas outlet of the combustor, and downwardly directed perforated gas distribution means located in the vessel and connected to the heat exchange means, the gas distribution means extending into the base region and releasing at diverse points across the plan of the vessel at a plurality of horizontally spaced locations.

2. A method for the heat treatment of a material in discrete form, the method including the steps of burning a fuel in a fluidised combustion bed contained within a combustor having at least one thermally conductive imperforate wall, arranging a heat treatment bed of the material so as to receive heat through said wall, forming combustion gases from the combustion bed directly into a plurality of spaced streams in which each stream in turn is formed into a plurality of smaller streams released at diverse points across the plan of the heat treatment bed, introducing said smaller streams into the base region of the heat treatment bed downwardly thereby distributing the gases throughout the base region of the heat treatment bed which is fluidised at least partly by said gases, and passing the combustion gases from the combustion bed in heat exchange relation with the heat treatment bed prior to the introduction of the gases into the heat treatment bed.

3. A method for calcination of gypsum in discrete form, the method including the steps of burning a fuel in a fluidised combustion bed contained with a combustor having at least one thermally conductive imperforate wall, arranging a heat treatment bed of gypsum so as to receive heat through said wall, continuously introducing gypsum to the heat treatment bed, continuously withdrawing calcined gypsum from the heat treatment bed, forming combustion gases from the combustion bed directly into a plurality of spaced streams in which each stream in turn is formed into a plurality of smaller streams released at diverse points across the plan of the heat treatment bed, introducing said smaller streams downwardly into the base region of the heat treatment bed thereby distributing the gases throughout the base region of the heat treatment bed which is fluidised at least partly by said gases, and passing the combustion gases from the combustion bed in heat exchange relation with the heat treatment bed prior to the introduction of the gases into the heat treatment bed.

4. A method for the calcination of gypsum in discrete form, the method including the steps of burning a solid fuel in a fluidised combustion bed contained within a combustor having at least one thermally conductive imperforate wall providing an extended heat exchange area, arranging a heat treatment bed of gypsum so as to receive heat through said wall, heating the heat treatment bed indirectly through the wall and extended heat exchange area, continuously introducing gypsum to the heat treatment bed, continuously withdrawing calcined gypsum from the heat treatment bed, forming combustion gases from the combustion bed directly into a plurality of spaced streams in which each stream in turn is formed into a plurality of smaller streams released at diverse points across the plan of the heat treatment bed and introducing said smaller streams downwardly into the base of the heat treatment bed thereby distributing the gases throughout the base region of the heat treatment bed which is fluidised at least partly by said gases.

5. A method for the heat treatment of a material in discrete form, the method including the steps of burning a solid fuel in a fluidised combustion bed contained within a combustor having at least one thermally conductive imperforate wall providing an extended heat exchange area, arranging a heat treatment bed of the material so as to receive heat through the wall and extended heat exchange area, forming combustion gases from the combustion bed directly into a plurality of spaced streams in which each stream in turn is formed into a plurality of smaller streams released at diverse points across the plan of the heat treatment bed, introducing said smaller streams downwardly into the base of the heat treatment bed thereby distributing the gases throughout the base region of the heat treatment bed which is fluidised at least partly by said gases, and passing the combustion gases from the combustion bed in heat exchange relation with the heat treatment bed prior to the introduction of the gases into the heat treatment bed.

6. A method for the heat treatment of a material in discrete form, a method including the steps of burning a solid fuel in a fluidised combustion bed contained within a combustor having at least one thermally conductive imperforate wall providing an extended heat exchange area, arranging a heat treatment bed of the material so as to receive heat through the wall and extended heat exchange area, forming combustion gases from the combustion bed directly into a plurality of spaced streams in which each stream in turn is formed of a plurality of smaller streams released at diverse points across the plan of the heat treatment bed and introducing said smaller streams downwardly into the base of the heat treatment bed thereby distributing the gases throughout the base region of the heat treatment bed which is fluidised at least partly by said gases.

7. The method according to claim 2 in which the upper level of the material in the heat treatment bed is maintained above the top level of the fluidised combustion bed.

8. Apparatus for the heat treatment of a material in a discrete form including a combustor adapted to contain a fluidised combustion bed of particulate material and having at least one imperforate thermally conductive wall for indirect heat exchange therethrough, said wall having protuberances to provide an extended area, a fuel inlet for the combustor, an exhaust gas outlet for the combustor, a heat treatment vessel enclosing at least the said wall to receive heat of combustion transmitted through the extended area thereof, the vessel being adapted to contain a bed of material in discrete form, a material inlet and a material outlet in the vessel, and a plurality of gas distribution means located in and end in the vessel and connected to the exhaust gas outlet, each gas distribution means spaced from another extending into the base region and releasing at diverse points across the plan of the vessel at a horizontal location and having perforations directed downwardly therein near its end.

9. Apparatus according to claim 8 in which at least one thermally conductive wall is corrugated.

10. Apparatus according to claim 8 in which an exhaust gas manifold is provided adjacent the heat treatment vessel and in heat exchange contact therewith, and said plurality of spaced perforated gas distribution pipes extend from the manifold across the base region of the vessel.

11. Apparatus according to claim 8 in which the heat treatment vessel surrounds the combustor and is separated therefrom by a thermally conductive indirect heat exchange wall.

12. Apparatus for the heat treatment of a material in discrete form including a horizontally elongate combustor adapted to contain a fluidised combustion bed of particulate material and having at least one horizontally elongate imperforate thermally conductive wall for indirect heat exchange therethrough, a fuel inlet for the combustor, an exhaust gas outlet for the combustor, a heat treatment vessel enclosing at least the said wall to receive heat transmitted therethrough from the combustion, the vessel being adapted to contain a bed of material in discrete form, a material inlet and a material outlet in the vessel, a horizontally extending exhaust gas manifold adjacent the heat treatment vessel and in heat exchange contact therewith, and a plurality of gas distribution means located in and ending in the vessel and connected to the manifold, the gas distribution means extending into and releasing at diverse points across the base region of the vessel at a plurality of horizontally spaced locations and having perforations directed downwardly therein near their ends.

13. Apparatus according to claim 12 in which the at least one thermally conductive wall has protuberances to provide an extended area.

14. Apparatus according to claim 13 in which the at least one thermally conductive wall is corrugated.

15. Apparatus according to claim 10 in which heat exchange means pass through the vessel and communicate with the exhaust gas outlet of the combustor and the exhaust gas manifold, and said plurality of spaced perforated gas distribution means extend from the manifold across the base region of the vessel.

16. Apparatus according to claim 12 in which the heat treatment vessel surrounds the combustor and is separated therefrom by a thermally conductive indirect heat exchange wall.

17. Apparatus for the heat treatment of a material in discrete form including a combustor adapted to contain a fluidised combustion bed of particulate material and having at least one imperforate corrugated thermally conductive wall for indirect heat exchange therethrough, a fuel inlet for the combustor, an exhaust gas outlet for the combustor, a heat treatment vessel enclosing at least the said corrugated wall to receive heat transmitted therethrough from the combustion, the vessel being adapted to contain a bed of material in discrete form, a material inlet and a material outlet in the vessel, and a plurality of downwardly directed perforated gas distribution means extending into the base region releasing at diverse points across the plan of the vessel at a plurality of horizontally spaced locations.

18. Apparatus according to claim 17 in which an exhaust gas manifold is provided adjacent the heat treatment vessel and in heat exchange contact therewith, and said plurality of spaced perforated gas distribution pipes extend from the manifold across the base region of the vessel.

19. Apparatus according to claim 17 in which the heat treatment vessel surrounds the combustor and is separated therefrom by a thermally conductive indirect heat exchange wall.

* * * * *